United States Patent [19]

Bentley

[11] 3,860,637

[45] Jan. 14, 1975

[54] SELECTIVE MANUFACTURE OF 4,4'-ISOMER OF DIAMINODIPHENYL-METHANE

[75] Inventor: Floyd Edward Bentley, Austin, Tex.

[73] Assignee: Jefferson Chemical Company, Inc., Houston, Tex.

[22] Filed: Jan. 26, 1971

[21] Appl. No.: 109,979

[52] U.S. Cl............................................ 260/570 D
[51] Int. Cl............................................. C07c 85/08
[58] Field of Search................................ 260/570 D

[56] References Cited
UNITED STATES PATENTS

| | | | |
|---|---|---|---|
| 2,974,168 | 3/1961 | Sharp et al........................ | 260/570 |
| 3,297,759 | 1/1967 | Curtiss et al...................... | 260/570 |
| 3,476,806 | 11/1969 | Wolf................................. | 260/570 |
| 3,517,062 | 6/1970 | Powers............................. | 260/570 |

Primary Examiner—Robert V. Hines
Attorney, Agent, or Firm—James L. Bailey; John R. Kirk, Jr.

[57] ABSTRACT

A mixture of poly-(methylenephenylamines) and diaminodiphenylmethane which contains less than 10 percent by weight of the 2,2' and 2,4' isomers in the diamine fraction may be made by separating the 2,2' and 2,4' isomers of diaminodiphenylmethane and recycling them to the feed of aniline and formaldehyde. This mixture of amines may be phosgenated to the corresponding isocyanates. The isocyanates are useful in the preparation of polyurethane foams.

2 Claims, No Drawings

SELECTIVE MANUFACTURE OF 4,4'-ISOMER OF DIAMINODIPHENYL-METHANE

BACKGROUND OF THE INVENTION

1. Field of the Invention

This invention relates to the field of polyamines.

2. Description of the Prior Art

The process of producing aromatic polyamines by the reaction of aniline and formaldehyde is well known and described for example in U.S. Pat. Nos. 2,683,730, 3,277,173, 3,344,162 and 3,362,979. By phosgenating these amines the corresponding isocyanates are obtained. The functionality and isomer distribution of the isocyanates is largely controlled by the amine precursor. The amine prescursor is usually a mixture of poly-(methylenephenylamines) of functionality greater than two and the 2,2' 2,4' and 4,4' isomers of diaminodiphenylmethane. The conventional process which reacts aniline with formaldehyde in the presence of a mineral acid catalyst produces a polyamine wherein the proportion of the 2,2' and 2,4' isomers in the diaminodiphenylmethane portion is usually less than 10 percent.

More recently, processes have been described for the reaction of aniline with formaldehyde which give products containing more than 10 percent of the 2,4'- and 2,2'-isomers in the diamine fraction. U.S.. Pat. Nos. 3,362,979 and 3,277,173 are examples of these processes. The resulting mixtures of aromatic polyamines and diaminodiphenyl methanes with greater than 10 percent of the 2,4'- and 2,2'- isomers in the diamine fraction may then be converted by, for example, reaction with phosgene to the corresponding mixture of polyisocyanates and diisocyanates which are useful in producing, for example, polyurethane foam.

As described in U.S. Pat. No. 3,362,979 such mixtures of aromatic polyisocyanates having more than 10 percent of the 2,4'- and 2,2'- isomer have advantages over the prior art composition in that they are more stable liquids and have less tendency to separate solids at low temperatures than similar aromatic polyisocyanates with less than 10 percent of the 2,4'- and 2,2'- isomers.

However, it has now been discovered that there are certain disadvantages in having the 2,4'- and 2,2'- isomers of diisocyanatodiphenylmethane present in large quantities when making polyurethane foam. For example, heat distortion temperatures and fire retardancy are adversely affected by the presence of significant quantities of 2,4'- and 2,2'- isomers.

Nevertheless, there are advantages to the processes which give rise to the precursor polyamines containing high proportions of the 2,2' and 2,4' diamine isomers. Particularly, for example, the process which employs a solid acidic siliceous catalyst (see U.S. Pat. No. 3,362,979) is economically favorable over the conventional hydrochloric acid catalyzed process (see U.S. Pat. No. 2,683,730) since large quantities of corrosive acid and caustic are avoided in the former.

Therefore the process of my invention permits the use of an economically preferred process for making polyamines from aniline and formaldehyde while obtaining a product containing less than 10 percent of 2,2' and 2,4' isomers in the diaminodiphenylmethane portion. This isomer distribution leads to superior performance when converted to polyisocyanates and subsequently to polyurethanes.

The process of this invention, however, is not to be restricted by the method whereby the aniline and formaldehyde are caused to react. Any process for the reaction of aniline and formaldehyde which results in greater than 10 percent of the 2,4'-and 2,2'- diamine isomers can be improved by the application of this invention.

SUMMARY OF THE INVENTION

The invention is a process for making aromatic polyamine by the reaction of aniline and formaldehyde by recycling the 2,2' and 2,4' isomers of diaminodiphenylmethane produced to the feed mixture of aniline and formaldehyde wherein the proportions of aniline, formaldehyde and 2,2' and 2,4' isomers of diaminodiphenylmethane in the feed results in little or no net make of the 2,2' and 2,4' isomers and less than 10 percent of these isomers in the final product.

DESCRIPTION OF THE PREFERRED EMBODIMENTS

Since the reaction of aniline and formaldehyde produce the 2,2' and 2,4' isomers of diaminodiphenylmethane as well as the 4,4' isomer it would be logical to assume that the recycle of the 2,2' and 2,4' isomers to the anilineformaldehyde feed would result in an ever increasing accumulation of the 2,2' and 2,4' isomers.

I have discovered, however, that if the proper proportions of aniline, formaldehyde, 2,2'-diaminodiphenylmethane, and 2,4'-diaminodiphenylmethane are reacted, that there is little if any net make of 2,2'- and 2,4'-diaminodiphenylmethane in the reaction product. This surprising result is based on the discovery that the 2,4'- and 2,2'- isomers of diaminodiphenylmethane are more reactive than the 4,4'-isomers toward further condensation with formaldehyde. Therefore the 2,4'- and 2,2'- isomers when recycled are preferentially converted to polyamides of functionality greater than 2 and therefore appear in the polyamine fraction rather than simply building up in the diamine fraction. Therefore, the 2,2' and 2,4' isomers in the product can be recycled to the feed resulting in a steady state process which ultimately yields polyamines and 4,4'-diaminodiphenylmethane but very little 2,2'- or 2,4'-diaminodiphenylmethane. In addition it is preferred that the final product contain from about 25 percent polyamine and 75 percent diaminodiphenylmethane to about 65 percent polyamine and 35 percent diaminodiphenylmethane.

The process of my invention requires aniline and formaldehyde in any form, e.g., formalin and paraformaldehyde. No particular catalyst is required. The invention is, of course, practically useful only to amine preparations wherein the amount of 2,2'- and 2,4'- diaminodiphenylmethane isomers amount to more than 10 percent of the diamine fraction. The principle of the invention, however, may be extended to reduce the 2,2' or 2,4' isomers to any lower amount.

The following example disclosed the essential features of my invention.

EXAMPLE 1

A few preliminary experiments were done on the reaction of aniline and formaldehyde in the presence of recycle 2,2'- and 2,4'-diaminodiphenylmethane. The object of these preliminary experiments was to provide sufficient information on the composition of reactants and the isomer distribution in the products so that a mathematical analysis could be made. Based on this analysis it was possible to predict what the reactant ratios should be such that there is little or no net production of the 2,2'- and 2,4'- isomers.

In this example, the final product desired consists of about 50 percent by weight of diaminodiphenylmethane containing less than 10 percent by weight of the 2,2'- and 2,4'-isomers combined and about 50 percent by weight of higher condensation products of aniline and formaldehyde with amine functionality greater than two.

From the above mentioned mathematical analysis it was determined to charge 279.3 g. of aniline (3 moles), 81.1 g. of 37 percent aqueous formalin (30.0 g. HCHO = 1 mole), 5.0 g. 2,2'-diaminodiphenylmethane, 29.9 g. 2,4'-diaminodiphenylmethane, and 4.7 g. Aerocat catalyst (a synthetic silica-alumina cracking catalyst). The aniline, diamine isomers, and catalysts were placed in a one-liter flask equipped with stirrer, nitrogen inlet tube, thermometer, dropping funnel, and a Dean-Stark type water trap mounted by a reflux condenser. The mixture was heated to 142°C. and the formalin was added dropwise from the dropping funnel over a 30-minute period while maintaining the temperature at about 140°C. Water was removed continuously from the reaction flask by means of the Dean-Stark trap. The aniline layer in the trap was returned to the flask and the mixture was then heated for 1 hour at 140°C. and then raised to 200°C. and held at that point with stirring for 2 hours. The reaction mixture was cooled, catalyst filtered, and 263.5 g. of material was thus obtained.

A gas-liquid chromatographic analysis of the reaction product mixture revealed the following composition:

| Product | Grams |
| --- | --- |
| Unreacted aniline | 97 |
| Polyamine | 63 |
| 2,2'-diaminodiphenylmethane | 6 |
| 2,4'-diaminodiphenylmethane | 33 |
| 4,4'-diaminodiphenylmethane | 64 |

Note that the 2,2' and 2,4' isomer content in the feed was about 35 grams and in the product was 39 grams. Thus, very little net make of these isomers resulted. 35 grams of the 2,2' and 2,4' isomers in the product may be recycled to the feed leaving only 4 grams of 2,2' and 2,4' isomers in the product or about 6 percent of the total diamine in the product.

EXAMPLE 2

Following the procedure of Example 1, a run was made to give a product substantially higher in polyamine using the following feed composition:

| | |
| --- | --- |
| Aniline | 372.4 grams |
| Formaldehyde | 60.0 |
| 2,2'-diaminodiphenylmethane | 5.0 |
| 2,4'-diaminodiphenylmethane | 31.5 |

After reaction, the product was analyzed by gas-liquid chromatography and was found to contain:

| Product | Grams |
| --- | --- |
| 2,2'-diaminodiphenylmethane | 6.3 |
| 2,4'-diaminodiphenylmethane | 37.8 |
| 4,4'-diaminodiphenylmethane | 93.4 |
| Polyamines | 155.5 |

It is observed that there was little net make of the 2,2'- and 2,4'-diamine isomers. After removal of 36.5 g. of these isomers by distillation for recycle, the product has a final composition of 39 percent diamine and 61 percent polyamine with only 7.7 percent of the diamine fraction being 2,2' and 2,4' isomers.

The method of removal of the 2,2'- and 2,4'-isomers from the reaction mixture is not an essential feature of this invention. It has been found, however, that these isomers are most readily removed for recycling by vacuum distillation, the 2,2'- and 2,4'-isomers boiling at a lower temperature than the 4,4'-isomers.

I claim:

1. In a process wherein aniline is reacted with formaldehyde to produce diaminodiphenylmethane containing greater than 10 percent by weight of the 2,2' and 2,4' isomers thereof and polyamines with functionality greater than two the improvement which comprises recycling a stream consisting essentially of all or a portion of the 2,2' and 2,4' isomers of diaminodiphenylmethane to the aniline-formaldehyde feed so that there is little or no net make of the 2,2' and 2,4' isomers of diaminodiphenylmethane and less than 10 percent by weight of the 2,2' and 2,4' isomers in the diamine fraction of the product.

2. A process as in claim 1 wherein the final product contains from about 25 percent by weight polyamine and 75 percent diaminodiphenylmethane to about 65 percent polyamine and 35 percent diaminodiphenylmethane.

* * * * *